US012585000B2

(12) United States Patent
Schuler et al.

(10) Patent No.: US 12,585,000 B2
(45) Date of Patent: ***Mar. 24, 2026

(54) RECEIVING DEVICE FOR AN OPTICAL MEASUREMENT APPARATUS FOR CAPTURING OBJECTS, LIGHT SIGNAL REDIRECTION DEVICE, MEASUREMENT APPARATUS AND METHOD FOR OPERATING A RECEIVING DEVICE

(71) Applicant: Valeo Schalter und Sensoren GmbH, Bietigheim-Bissingen (DE)

(72) Inventors: Thomas Schuler, Bietigheim-Bissingen (DE); Ho Hoai Duc Nguyen, Bietigheim-Bissingen (DE); Petr Hovorka, Prague (CZ); Felix Müller, Bietigheim-Bissingen (DE); Werner Hartmann, Bietigheim-Bissingen (DE); Spandan Shroff, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 1243 days.

This patent is subject to a terminal disclaimer.

(21) Appl. No.: 17/426,170

(22) PCT Filed: Jan. 22, 2020

(86) PCT No.: PCT/EP2020/051460
§ 371 (c)(1),
(2) Date: Jul. 28, 2021

(87) PCT Pub. No.: WO2020/156894
PCT Pub. Date: Aug. 6, 2020

(65) Prior Publication Data
US 2022/0099804 A1 Mar. 31, 2022

(30) Foreign Application Priority Data
Jan. 28, 2019 (DE) ..................... 10 2019 101 967.2

(51) Int. Cl.
*G01S 7/48* (2006.01)
*G01S 7/481* (2006.01)
(Continued)

(52) U.S. Cl.
CPC .......... *G01S 7/4816* (2013.01); *G01S 7/4817* (2013.01); *G02B 26/0808* (2013.01); *G02B 26/10* (2013.01); *G01S 17/08* (2013.01)

(58) Field of Classification Search
None
See application file for complete search history.

(56) References Cited

U.S. PATENT DOCUMENTS

| | | | |
|---|---|---|---|
| 10,061,019 B1 | 8/2018 | Campbell et al. | |
| 2008/0238760 A1* | 10/2008 | Mack ...................... | G01S 7/489 342/54 |

(Continued)

FOREIGN PATENT DOCUMENTS

| | | |
|---|---|---|
| DE | 102017201127 A1 | 7/2018 |
| DE | 102017116598 A1 | 1/2019 |

(Continued)

OTHER PUBLICATIONS

International Search Report and Written Opinion in corresponding International Application No. PCT/EP2020/051460, mailed Mar. 16, 2020 (14 pages).

(Continued)

*Primary Examiner* — Hovhannes Baghdasaryan
(74) *Attorney, Agent, or Firm* — Osha Bergman Watanabe & Burton LLP

(57) ABSTRACT

The invention relates to a receiving device (26) for an optical measurement apparatus (12) for capturing objects (18) in a monitoring region (16), to a light signal redirection device (40), to an optical measurement apparatus (12) and to a method for operating a receiving device (26). The receiving (Continued)

device (26) comprises at least one light signal redirection device (40) for redirecting light signals (32) from the monitoring region (16) to at least one receiver (36) of the receiving device (26) and at least one receiver (36) for receiving and for converting the light signals (22) into electric signals. The at least one light signal redirection device (40) has at least one redirection region (42*b*), which can act on the light signals (22) so as to change their direction. Furthermore, the receiving device (26) comprises at least one drive device (50) with which the at least one redirection region (42*b*) can be set. At least one redirection region (42*b*) has at least one diffractive structure.

14 Claims, 3 Drawing Sheets

(51) Int. Cl.

| | | |
|---|---|---|
| *G02B 26/08* | (2006.01) | |
| *G02B 26/10* | (2006.01) | |
| *G01S 17/08* | (2006.01) | |

(56) References Cited

U.S. PATENT DOCUMENTS

| | | |
|---|---|---|
| 2016/0316180 A1 | 10/2016 | Han et al. |
| 2018/0284274 A1 | 10/2018 | LaChapelle |

FOREIGN PATENT DOCUMENTS

| | | |
|---|---|---|
| EP | 3428118 A1 | 1/2019 |
| WO | 2005-068353 A1 | 7/2005 |
| WO | 2012-045603 A1 | 4/2012 |
| WO | 2014-09505 A2 | 1/2014 |
| WO | 2014-095105 A1 | 6/2014 |
| WO | 2017095817 A1 | 6/2017 |

OTHER PUBLICATIONS

German Search Report in corresponding German Application No. 10 2019 101 967.2, dated Jan. 24, 2020 (12 pages).

* cited by examiner

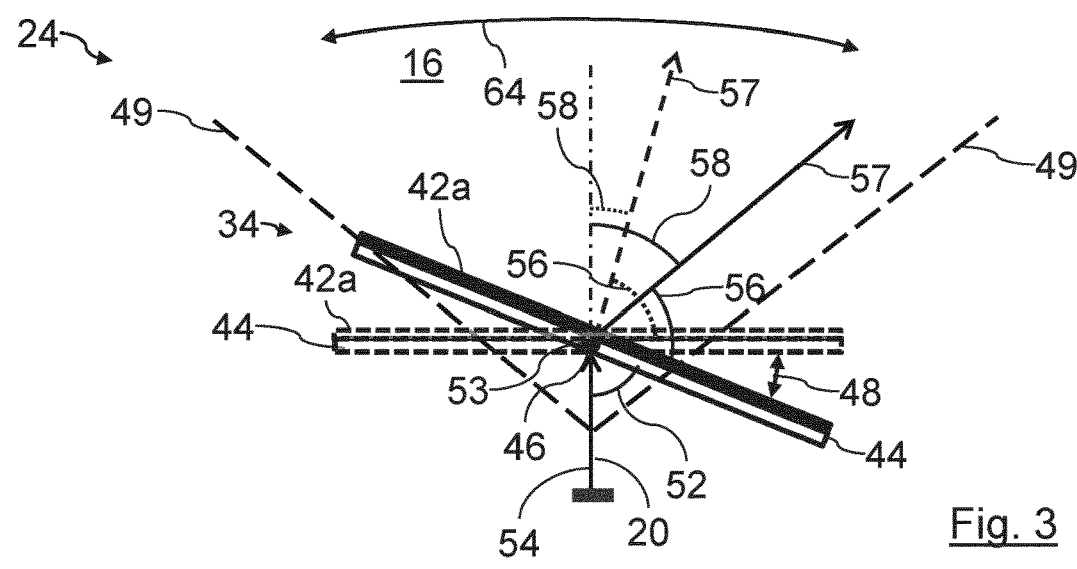
Fig. 3
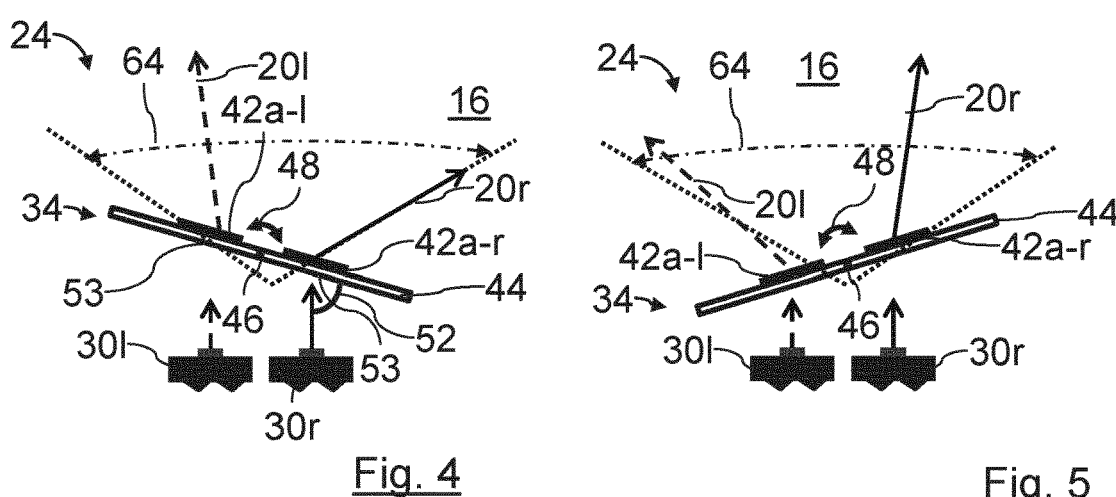
Fig. 4
Fig. 5
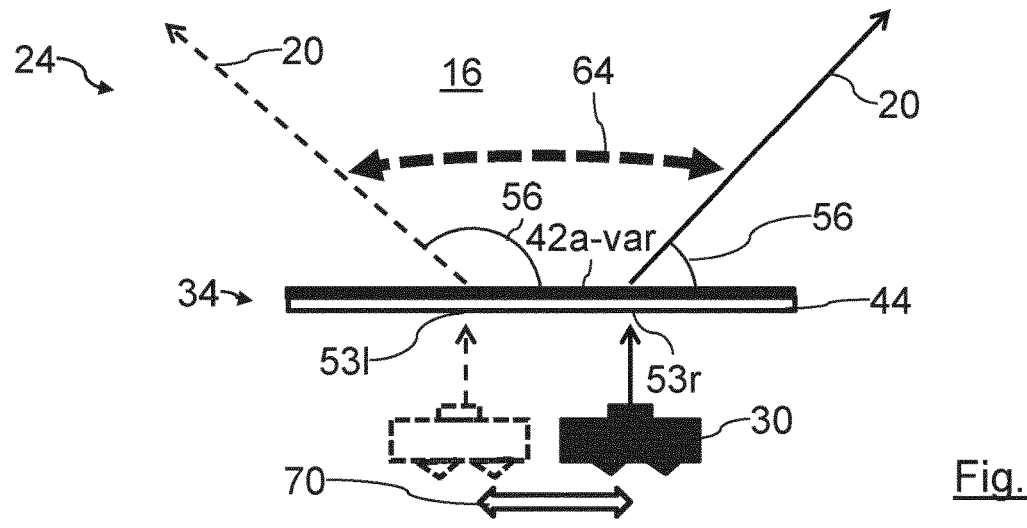
Fig. 6

RECEIVING DEVICE FOR AN OPTICAL MEASUREMENT APPARATUS FOR CAPTURING OBJECTS, LIGHT SIGNAL REDIRECTION DEVICE, MEASUREMENT APPARATUS AND METHOD FOR OPERATING A RECEIVING DEVICE

TECHNICAL FIELD

The invention relates to a receiving device for an optical measurement apparatus for capturing objects in a monitoring region, having at least one light signal redirection device for redirecting light signals from the monitoring region to at least one receiver of the receiving device, wherein the at least one light signal redirection device has at least one redirection region that can act on the light signals so as to change their direction, having at least one receiver for receiving and for converting the light signals to electric signals, and having at least one drive device with which the at least one redirection region can be set.

The invention furthermore relates to a light signal redirection device for a receiving device of an optical measurement apparatus for capturing objects in a monitoring region, wherein the light signal redirection device has at least one redirection region that can act on light signals from the monitoring region so as to change their direction.

The invention additionally relates to an optical measurement apparatus for capturing objects in a monitoring region, having at least one transmission device for transmitting light signals into the monitoring region, at least one receiving device with which light signals that have been reflected at objects that may be present in the monitoring region can be received, and having at least one control and evaluation device with which the at least one transmission device and the at least one receiving device can be controlled and with which light signals received can be evaluated, wherein at least one receiving device has at least one light signal redirection device for redirecting light signals from the monitoring region to at least one receiver of the receiving device, wherein the at least one light signal redirection device has at least one redirection region that can act on the light signals so as to change their direction, at least one receiver for receiving and for converting the light signals to electric signals, and at least one drive device with which the at least one redirection region can be set.

The invention furthermore relates to a method for operating a receiving device of an optical measurement apparatus for capturing objects in a monitoring region, in which light signals are transmitted from the monitoring region onto at least one redirection region of at least one light signal redirection device, a direction of the light signals is changed with the at least one redirection region in dependence on an incidence of the light signals, and the light signals are directed to at least one receiver of the receiving device, wherein the at least one redirection region is set using at least one drive device.

PRIOR ART

WO 2012/045603 A1 discloses a redirection mirror arrangement for an optical measurement apparatus. The optical measurement apparatus comprises a housing having a base plate. A transmission window, through which for example pulsed laser light is emitted, and a receiving window, through which laser light that has been reflected by objects in a monitoring region is received, have been disposed in the housing. A transmission unit, a receiver unit and a redirection mirror arrangement are arranged in the housing. The redirection mirror arrangement comprises a transmission mirror unit having two transmission redirection mirrors, which are arranged with a radial distance on a carrier plate in a common horizontal plane, and a receiving mirror unit having two receiving redirection mirrors, which are mounted with a radial distance in each case on one side of a carrier body. The transmission mirror unit and the receiving mirror unit are arranged with an axial distance from one another on a common rotatable pivot. A drive unit driving the rotatable pivot is arranged substantially in the space between the two transmission redirection mirrors. The fixed optical transmitter generates pulsed laser beams, which are redirected via the rotary transmission mirror unit and emitted through the transmission window into the region to be monitored. Pulsed laser beams that are reflected by objects or obstacles arranged in the monitoring region as a reaction to the transmitted pulsed laser beams are received via the receiving window. The received laser beams are redirected via the receiving mirror unit and guided to the fixed optical receiver by the fixed receiving optical unit. The output signal of the optical receiver is evaluated to ascertain the time of flight of the laser beams so as to ascertain the distance from a detected object in the monitoring region.

The invention is based on the object of creating a receiving device, a light signal redirection device, an optical measurement apparatus and a method of the type mentioned in the introductory part, in which a redirection of the light signals from at least one monitoring region to at least one receiver can be simplified. In particular, the aim is to simplify the outlay in terms of components, assembly and/or adjustment and/or to improve reliability, in particular service life. Alternatively or additionally, the aim is to achieve an enlargement of the field of view and/or an improvement of the resolution.

DISCLOSURE OF THE INVENTION

This object is achieved according to the invention in the case of the receiving device by virtue of the fact that at least one redirection region has at least one diffractive structure.

According to the invention, at least one diffractive structure is used to diffract the light signals from the monitoring region and thereby change and/or set the direction thereof. Diffractive structures can be easily realized and managed. An adjustment outlay can be reduced compared to known redirection mirrors. The requirements in terms of the quality of the light signals can be correspondingly lowered. Furthermore, diffractive structures can be individually adapted to achieve the desired direction-changing effect on the light signals.

As is known, diffractive structures are structures at which light beams, in particular laser beams, can be shaped. This is accomplished in the form of diffraction at optical gratings. In this case, the diffractive structures can be designed individually. They can be implemented in a manner such that the direction of an incident light beam is accordingly changed by the diffractive structure in dependence on the angle of incidence and/or a point of incidence on the diffractive structure. Diffractive structures can be operated in transmission and/or reflection.

Advantageously, at least one redirection region can be at least one diffractive structure. In this way, the at least one redirection region has at least one diffractive structure.

The invention can be used to implement a receiving device for an optical measurement apparatus having a long-lasting and maintenance-free light signal redirection device. The light signal redirection device can furthermore be designed in a simple and compact manner. It is thus possible to achieve high flexibility without the need for a complex optical design. It is furthermore possible using the measurement apparatus according to the invention to capture a large field of view with a high resolution. For example, it is thus possible to reduce a requirement regarding large lenses on the transmission side or the receiver side.

Using the at least one drive device, the at least one redirection region is set. In this way, the at least one redirection region can be set to different parts of the monitoring region. Alternatively or additionally, an incidence of the light signals on the at least one redirection region can thus be set. The incidence is characterized by the angle of incidence and the point of incidence at which the light signal is incident on the at least one redirection region. To change the incidence, either the angle of incidence or the point of incidence or both can be changed.

Advantageously, the at least one redirection region can be set by way of rotating or pivoting and/or displacement. The angle of incidence can advantageously be changed by way of rotating or pivoting the at least one redirection region relative to the beam direction of the incident light signal.

The point of incidence can advantageously be changed by way of displacement, in particular using linear displacement, of the at least one redirection region relative to the beam direction of the incident light signal. In this case, the displacement can advantageously be performed transversely, in particular perpendicularly, to the beam direction of the incident light signal.

The incidence of the light signals on at least one redirection region can be direct or indirect. In particular, light signal coming from the monitoring region can be directed onto the at least one redirection region indirectly with the aid of at least one optically effective element that is connected upstream. Additionally or alternatively, the light signal can be directed onto at least one rear redirection region with the aid of at least one redirection region that is a front redirection region as viewed in the beam direction.

Advantageously, at least one light signal can be realized in the form of a light pulse. A start and an end of a light pulse can be determined, in particular measured. In this way, it is possible in particular to determine light travel times.

Advantageously, at least one light signal can also contain further information. For example, a light signal can in particular be encoded. In this way, it can be identified more easily and/or corresponding information can be carried along more easily.

Advantageously, the optical measurement apparatus can have at least one transmission device. The receiving device and the at least one transmission device can be advantageously adapted to one another. The at least one transmission device can have at least one transmitter light source for transmitting light signals. Furthermore, the at least one transmission device can have at least one light signal redirection device for redirecting the light signals into at least one monitoring region of the measurement apparatus. The at least one light signal redirection device of the at least one transmission device can have at least one redirection region, which can act on the light signals in dependence on the incidence of the light signals so as to change their direction.

The at least one transmission device can have at least one drive device with which an incidence of the light signals on the at least one redirection region can be set.

Advantageously, the optical measurement apparatus can operate according to a time-off-light method, in particular a light pulse time-of-flight method. Optical measurement apparatuses operating in accordance with the light pulse time-of-flight method can be designed and referred to as time-of-flight systems (TOF), light detection and ranging systems (LiDAR), laser detection and ranging systems (LaDAR) or the like. Here, a time of flight from the emission of a light signal using the transmission device and the receipt of the corresponding reflected light signal using the corresponding receiving device of the measurement apparatus is measured, and a distance between the measurement apparatus and the detected object is ascertained therefrom.

Advantageously, the optical measurement apparatus can be designed as a scanning system. In this context, a monitoring region can be sampled, that is to say, scanned, with light signals. To this end, the beam directions of the corresponding light signals can be swept, as it were, over the monitoring region. At least one light signal redirection device is used in this case.

Advantageously, the optical measurement apparatus can be designed as a laser-based distance measurement system. The laser-based distance measurement system can have, as the transmitter light source, at least one laser, in particular a diode laser. The at least one laser can be used to transmit in particular pulsed laser signals as light signals. The laser can be used to emit light signals in frequency ranges that are visible or not visible to the human eye. Accordingly, at least one receiving device can have a detector designed for the frequency of the emitted light, in particular an (avalanche) photodiode, a diode array, a CCD array or the like. The laser-based distance measurement system can advantageously be a laser scanner. A laser scanner can be used to scan a monitoring region with in particular pulsed laser signals.

The optical measurement apparatus can be used advantageously in a vehicle, in particular a motor vehicle. The measurement apparatus can advantageously be used in a land-based vehicle, in particular a passenger vehicle, a truck, a bus, a motorcycle or the like, an aircraft and/or a watercraft. The measurement apparatus can also be used in vehicles that can be operated autonomously or at least partially autonomously. The measurement apparatus can also be used as a stationary measurement apparatus.

The measurement apparatus can be used to capture standing or moving objects, in particular vehicles, persons, animals, obstacles, road unevennesses, in particular potholes or rocks, roadway boundaries, free spaces, in particular free parking spaces, or the like.

Advantageously, the optical measurement apparatus can be part of a driver assistance system and/or of a chassis control system of a vehicle or be connected thereto. The information ascertained with the optical measurement apparatus can be used for controlling function components of the vehicle. The function components can be used to control in particular driving functions, in particular steering, a brake system and/or a motor, and/or signalling devices of the vehicle. For example, if an object is detected using the optical measurement apparatus, the corresponding function components can be used to steer the vehicle and/or change the speed thereof, in particular stop it, and/or output at least one signal.

In one advantageous embodiment, at least one diffractive structure can be designed as a diffractive optical element.

Diffractive optical elements (DoE) can be manufactured individually and be adapted to the corresponding requirements. Diffractive optical elements can be used to achieve a targeted and individually prescribable change, in particular diffraction, of the light signals.

In one further advantageous embodiment, at least one redirection region can have a transmissive effect for the light signals and/or at least one redirection region can have a reflective effect for the light signals.

Advantageously, the light signal redirection device can have either redirection regions that have a transmissive effect for the light signals or redirection regions that have a reflective effect for the light signals.

Alternatively, the light signal redirection device can have both at least one light-transmissive redirection region and also at least one reflective redirection region.

Redirection regions that are transmissive to light signals have the advantage that the at least one receiver can be arranged on the side opposite the monitoring region. As a result, there are no zones that are obscured by the at least one receiver.

Reflective redirection regions have the advantage that they can radiate into the rearwards space, in which the at least one receiver can be located. In this way, reflective redirection regions can be used in particular if the redirection region is intended to be used as part of a position capturing device for capturing the position or setting of the light redirection device. In this case, the light signal can be advantageously encoded with corresponding position information using at least one diffractive structure of the at least one redirection region.

In a further advantageous embodiment, at least one redirection region can be implemented in, at and/or on at least one substrate that is transmissive to the transmission light. The substrate can be used to increase a mechanical stability. Furthermore, the substrate can be used as a mechanical retainer. For example, the substrate can in particular be mounted on a corresponding pivot about which it can be rotated or pivoted. The incidence of the light signals on the at least one redirection region can thus be changed, in particular set.

The substrate can advantageously be made from glass, plastic or the like, on which the respective diffractive optical element can be implemented by way of coating or removal, in particular etching or the like.

Advantageously, at least one substrate can be implemented in the form of a thin layer.

In one further advantageous embodiment, at least one redirection region can be arranged on the light entry side of a substrate and/or at least one redirection region can be arranged on the light exit side of a substrate. In this case, at least one redirection region may be provided either on the light entry side or on the light exit side. Alternatively, in each case at least one redirection region may be provided both on the light entry side and also on the light exit side.

Using redirection regions on the light entry side, the corresponding diffraction of the light signals can take place before they enter the substrate. In this way, the light can be directed in the substrate onto different redirection regions located on the light exit side of the substrate.

Using redirection regions on the light exit side, the light signals can be directed directly to the at least one receiver.

In a further advantageous embodiment, at least one light signal redirection device can have at least two redirection regions that are arranged one behind the other with respect to the beam path of the light signals. In this way it is possible, depending on the incidence of the light signals on a first redirection region, which is a front redirection region in the beam direction of the light signals, to direct the light signals onto a rear, second redirection region using the front redirection region.

Advantageously, the at least two redirection regions can be arranged obliquely one behind the other or directly one behind the other or one behind the other with a partial overlap.

Advantageously, at least one front redirection region can be arranged on a side of a substrate that is a front side with respect to the beam direction of the light signals, that is to say the light entry side, i.e. the side facing the monitoring region. At least one rear redirection region can be arranged on the rear side, the light exit side, of the substrate.

Advantageously, a rear redirection region and at least two front redirection regions can be provided. In this way, the light signals can always be directed by both front redirection regions onto the one rear redirection region. The front redirection regions can have different properties with respect to the shaping of the light signals. Using the rear redirection region, the light signals can always be directed onto the at least one receiver, wherein it is immaterial from which front redirection region they come.

Advantageously, a large number of diffractive structures can be arranged on the light entry side. In this way, a corresponding amount of different individual angles of diffraction can be realized along the extent of the redirection regions.

In a further advantageous embodiment, a direction-changing property of at least one redirection region can vary over its extent in at least one direction of extent and/or the at least one light signal redirection device can have at least two redirection regions having different direction-changing properties. One redirection region whose direction-changing properties vary over its extent can be used to realize in particular continuously a variation of the direction change of the light signals depending on the incidence.

Alternatively or additionally, the at least one light signal redirection device can have at least two redirection regions with different direction-changing properties. In this way, the at least two redirection regions can act separately on the light signals in dependence on the incidence thereof so as to change their direction.

Advantageously, at least two redirection regions can be arranged one next to the other without a gap.

In a further advantageous embodiment, at least one redirection region of at least one light signal redirection device can be movable using at least one drive device. In this way, the at least one drive device can be used to set, in particular change, the incidence of the light signals on the at least one redirection region.

Advantageously, the at least one drive device can implement a rotating drive, a linear drive or a drive of a different type. In this way, corresponding rotational and/or displacement movements of the light signals relative to the at least one redirection region can be performed.

Advantageously, at least one drive device can have at least one motor, in particular a rotation motor, a linear motor, a linear direct current motor, a moving-coil motor, a moving-coil drive or the like, or a motor or actuator of a different type. It is possible to simply implement an electrical drive by way of electric motors. Moreover, moving-coil motors can have a simple design. They can be easily controlled. They are also low-wear. In addition, moving-coil motors are free from brushes, as a result of which the lifetime is extended and the maintenance work is reduced. A moving-coil motor can be used without reversing polarity. In this way, the functional reliability can be increased.

Moving-coil motors have two separate parts. A magnetic housing and a coil. By applying a voltage, the motor is moved in one direction. By reversing the voltage, the motor is moved in the opposite direction. The force generated is proportional to the electric current running through the coil. This force is nearly constant in the specified stroke range of the moving-coil motor.

Advantageously, the coil of the moving-coil motor can act as a rotor and the magnet can act as a stator. In this way, the moving mass can be reduced. The rotor requires a voltage supply.

Alternatively, the magnet of the moving-coil motor can be implemented as the rotor and the coil can be implemented as the stator. In this way, no voltage supply may be needed for the rotor. The mass to be moved that is correspondingly greater can be reduced by the use of rare-earth magnets.

Advantageously, at least one drive device can be connected directly to the at least one redirection region, in particular at least one substrate on which the at least one redirection region is implemented. In this way, the at least one redirection region can be accelerated and decelerated more quickly. The light signal redirection device according to the invention can thus be operated at a higher speed and with a longer lifetime compared to a conventional rotating mirror that is driven in rotation using a motor.

Advantageously, at least one redirection region, in particular the substrate on which the at least one redirection region is implemented, can be driven in rotation or oscillation. Advantageously, a rotation angle of the at least one drive device can be delimited. In this way, the redirection of the light signals onto the desired field of view can be set.

Advantageously, the same drive device can be used for a transmission device and a receiving device of the optical measurement apparatus. In this way, the outlay in terms of drive devices can be reduced.

Advantageously, the light signal redirection device of the transmission device can be mechanically coupled to a corresponding light signal redirection device of the receiving device. In this way, the two light signal redirection devices can be driven together.

Advantageously, light signal redirection devices of the transmission device can have at least one redirection region in the form of a diffractive structure.

Advantageously, at least one redirection region of the transmission device and at least one redirection region of the receiving device can be implemented on a common substrate. In this way, the redirection regions can be produced together. In addition, the redirection regions can be moved simply with the aid of the substrate and a corresponding drive device.

In a further advantageous embodiment, at least one redirection region can be arranged so as to be rotatable and/or pivotable and/or displaceable. In this way, the at least one redirection region can be set by correspondingly moving the at least one redirection region. Light signals can thus be captured from different directions of the monitoring region.

Advantageously, the at least one redirection region, in particular a substrate on which the at least one redirection region is arranged, can have at least one pivot for rotation and/or pivoting. In this way, it is possible to change the incidence in a spatial dimension. Alternatively or additionally, at least one redirection region, in particular a substrate on which the at least one redirection region is arranged, can have at least two pivots for rotation or pivoting. In this way, a corresponding rotation or pivoting can be effected in two dimensions. Accordingly, the monitoring region can be scanned in two dimensions. Advantageously, the at least two pivots for rotation or pivoting can extend perpendicular to one another. In this way, efficient two-dimensional scanning can be realized.

In a further advantageous embodiment, at least one receiver can have at least one (avalanche) photodiode, a diode array, a CCD array or the like. Using such receivers, light signals, in particular light pulses, preferably laser signals, can be received and converted to electric signals. The electric signals can be evaluated using a corresponding evaluation device.

Advantageously, at least one transmitter light source can have at least one laser. Light pulses can be sent in a targeted manner using a laser. A distance of a captured object from the measurement apparatus can thus be ascertained with the aid of a time-of-flight method. The at least one transmitter light source can consist of at least one laser. Alternatively, at least one laser can be part of the at least one transmission light source.

Advantageously, at least one transmitter light source can have at least one surface emitter (VCSEL), an edge emitter, a fibre laser, a diode laser or a laser of a different type, in particular semiconductor laser. Such transmitter light sources can be implemented in a simple and compact manner.

Advantageously, the receiving device can have more than one receiver. In this way, a plurality of redirection regions can be irradiated by corresponding light signals at the same time or with a time offset. A plurality of light signals can thus be received simultaneously from different parts of the monitoring region. A frame rate during scanning of the monitoring region can thus be increased. Overall, the monitoring region can thus be scanned more quickly. Furthermore, the field of view of the measurement apparatus can be increased by the combination of a plurality of receivers with a plurality of redirection regions.

In a further advantageous embodiment, the receiving device can have at least one optical system, which is arranged between at least one receiver and at least one redirection region. The optical system can be used to correspondingly shape the light signals, in particular focus them on the at least one receiver.

Advantageously, at least one optical system can have at least one optical lens. The light signals can be shaped using an optical lens.

Furthermore, the object is achieved according to the invention in the case of the light signal redirection device by virtue of the fact that at least one redirection region has at least one diffractive structure.

According to the invention, the light signals are diffracted using the at least one diffractive structure. A beam direction of the light signals can thus be changed easily and exactly.

In addition, the object is achieved according to the invention in the case of the optical measurement apparatus by virtue of the fact that at least one redirection region of the at least one receiving device has at least one diffractive structure.

Advantageously, the at least one receiving device can be designed as a receiving device according to the invention.

Advantageously, the at least one transmission device can have at least one light signal redirection device. The at least one light signal redirection device on the transmitter side can be constructed and/or act according to the same or a similar principle as the at least one light signal redirection device on the receiver side, in particular the receiving device according to the invention.

Advantageously, the at least one light signal redirection device on the transmitter side can have at least one redirection region with at least one diffractive structure.

Advantageously, the at least one light signal redirection device, in particular the at least one redirection region, can be mechanically coupled, on the side of the receiver, to the at least one light signal redirection device on the side of the transmitter. In this way, the corresponding redirection regions can be set, in particular controlled, together.

Alternatively, the at least one light signal redirection device on the receiver side can be operated separately from the at least one light signal redirection device on the transmitter side.

The object is furthermore achieved according to the invention in the case of the method by virtue of the fact that the direction of the light signals is set with the aid of at least one diffractive structure.

According to the invention, at least one diffractive structure is used to set the beam direction of the light signals.

In an advantageous refinement of the method, at least one redirection region can be moved in order to set the at least one redirection region. In this way it is possible, depending on the prescribed property of the at least one diffractive structure, to achieve a corresponding change in direction of the beam direction of the light signal.

Moreover, the features and advantages indicated in connection with the receiving device according to the invention, the light signal redirection device according to the invention, the measurement apparatus according to the invention and the method according to the invention and the respective advantageous configurations thereof apply here in a mutually corresponding manner and vice versa. The individual features and advantages can of course be combined with one another, wherein further advantageous effects can occur that go beyond the sum of the individual effects.

BRIEF DESCRIPTION OF THE DRAWINGS

Further advantages, features and details of the invention are apparent from the following description, in which exemplary embodiments of the invention will be explained in more detail with reference to the drawing. A person skilled in the art will also expediently consider the features which have been disclosed in combination in the drawing, the description and the claims individually and combine them to form further meaningful combinations. In the drawing, schematically:

FIG. 3 shows a light redirection device of a transmission device of the measurement apparatus from FIG. 2 viewed in the direction of a pivot with which the light signal redirection device can be pivoted;

FIGS. 4 and 5 show a transmission device of an optical measurement apparatus according to a second exemplary embodiment having two transmitter light sources, wherein the light redirection device is illustrated in two different pivot positions;

FIG. 6 shows a transmission device of an optical measurement apparatus according to a third exemplary embodiment, wherein the transmitter light source is linearly displaceable;

In the figures, identical components are provided with the same reference numerals.

EMBODIMENT(S) OF THE INVENTION

Figure 1:
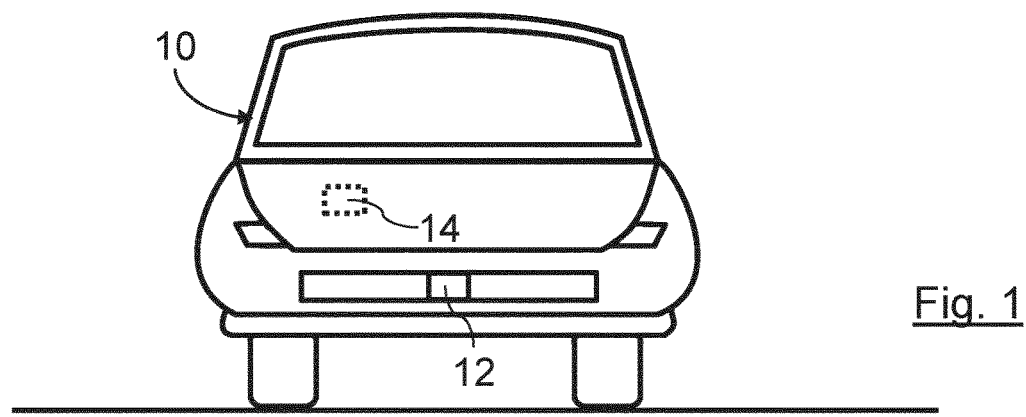
FIG. 1 shows a front view of a vehicle having an optical measurement apparatus, which is connected to a driver assistance system.

FIG. 1 illustrates a vehicle 10, for example a passenger vehicle, in the front view. The vehicle 10 has an optical measurement apparatus 12, for example a laser scanner. The optical measurement apparatus 12 is arranged for example in a front bumper of the vehicle 10. The vehicle 10 furthermore has a driver assistance system 14, with which the vehicle 10 can be operated autonomously or partially autonomously. The optical measurement apparatus 12 is functionally connected to the driver assistance system 14, with the result that information that can be acquired with the measurement apparatus 12 can be transmitted to the driver assistance system 14. The measurement apparatus 12 can be used to monitor a monitoring region 16, located, in the exemplary embodiment shown, in the driving direction in front of the motor vehicle 10, for objects 18.

The measurement apparatus 12 operates in accordance with a time-of-flight method. For this purpose, light signals 20, for example in the form of laser pulses, are transmitted into the monitoring region 16. Light signals 22, which have been reflected at an object 18 that may be present, are received by the measurement apparatus 12. A distance of the object 18 from the measurement apparatus 12 is ascertained from a time of flight between the transmission of the light signals 20 and the receipt of the reflected light signals 22. The beam direction of the light signals 20 is swept over the monitoring region 16 during the measurements. The monitoring region 16 is scanned in this way. A direction of the object 18 relative to the measurement apparatus 12 is ascertained from the beam direction of the light signals 20, which are reflected at the object 18.

The measurement apparatus 12 comprises a transmission device 24, a receiving device 26 and an electronic control and evaluation device 28.

Figure 2:
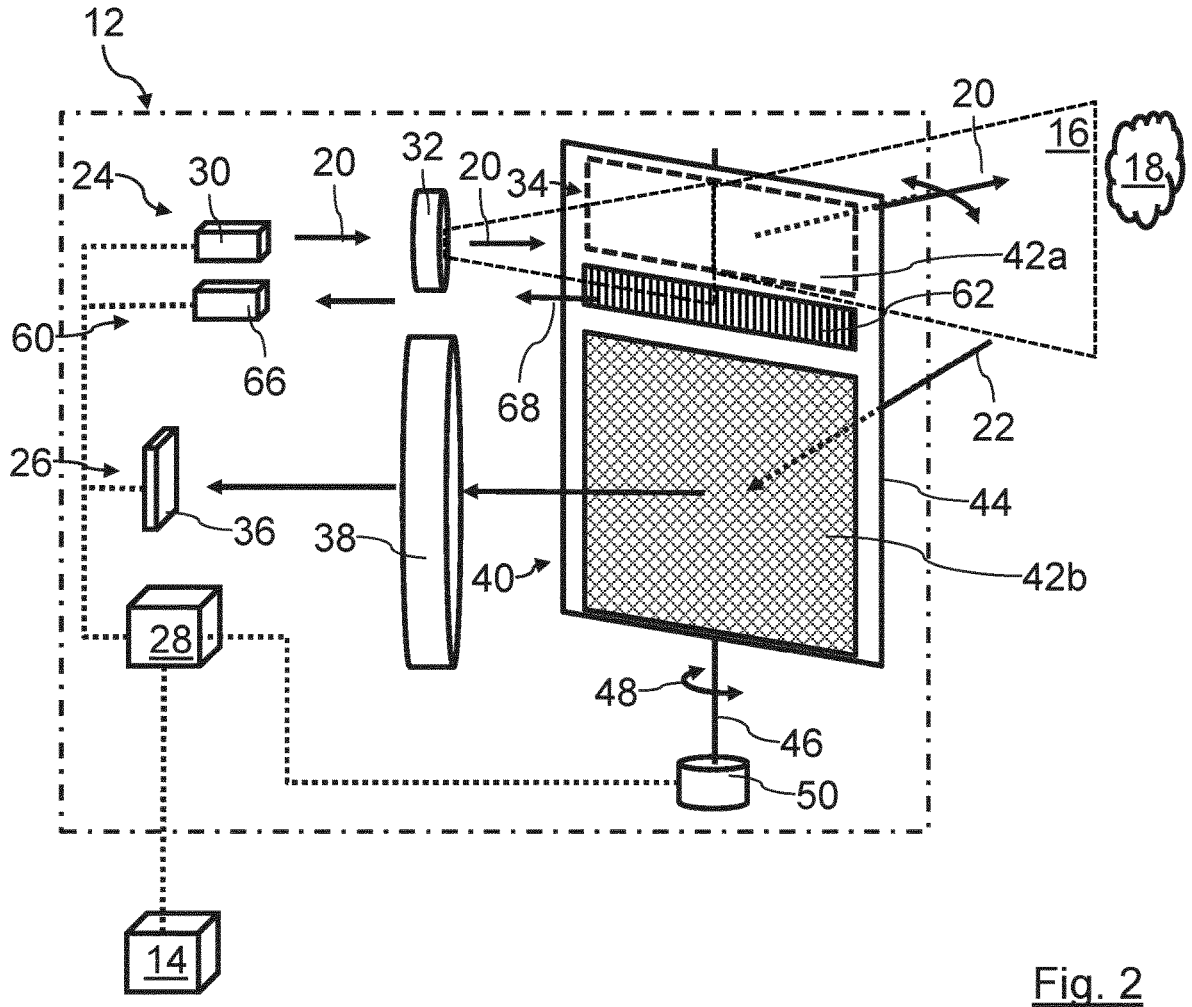
FIG. 2 shows an optical measurement apparatus according to a first exemplary embodiment having a driver assistance system, which can be used in the vehicle from FIG. 1.

The transmission device 24, which is shown by way of example in FIG. 2, comprises a transmission light source 30, an optical system in the form of a transmission lens 32 and a transmitter light signal redirection device 34.

The receiving device 26 comprises an optical receiver 36, a receiver lens 38 and a receiver light signal redirection device 40.

The transmitter light source 30 has, for example, one laser. Pulsed laser signals can be generated in the form of light signals 20 using the transmission light source 30.

The light signals 20 can be expanded in a direction transversely to their beam direction using the transmitter lens 32. This is indicated in FIG. 2 by way of a dashed trapezium. In the exemplary embodiment shown, the light signals are expanded using the transmitter lens 32 in the direction of a pivot 46, for example in the vertical direction.

The transmitter light signal redirection device 34 is located in the beam path of the transmitter light source 30 downstream of the transmitter lens 32. The beam direction of the light signals 20 can be swept in one plane with the aid of the transmitter light signal redirection device 34. For example, the sweeping plane extends perpendicular to the direction in which the light signals 20 are expanded using the transmitter lens 32, that is to say for example horizontally. In this way, the monitoring region 16 can be scanned in the horizontal direction using light signals 20 that follow one behind the other.

Reflected light signals 22 are redirected, using the receiver light signal redirection device 14, out of the monitoring region 16 onto the receiver lens 38. The reflected light signals 22 are imaged onto the receiver 36 using the receiver lens 38.

The receiver 36 is designed, for example, as a CCD chip, array, photodiode or a detector of a different type for receiving the reflected light signals 22 in the form of laser pulses. The received light signals 22 are converted to electronic signals using the receiver 36. The electronic signals are transmitted to the control and evaluation device 28.

The transmission device 24 and the receiving device 26 are controlled by the control and evaluation device 28. Furthermore, the electronic signals obtained from the received light signals 22 are evaluated using the control and evaluation devices 28. The time of flight and, on the basis thereof, the distance of the object 18 at which the light signals 22 have been reflected are ascertained using the control and evaluation devices 28. In addition, the direction of the object 18 is ascertained using the control and evaluation devices 28.

The transmitter light redirection device 24 comprises, by way of example, a transmitter redirection region 42a in the form of a diffractive structure. The diffractive optical structure is implemented for example as what is known as a diffractive optical element. The transmitter redirection region 42a is implemented for example on a rectangular, flat substrate 44. The substrate 44 is, for example, a glass plate or plastics plate, also in the form of a thin film, which is transmissive to the light signals 20. The transmitter redirection region 42a is arranged on the side of the substrate 44 facing away from the transmission lens 32. The transmitter redirection region 42a extends, in the form of a strip, nearly over the entire width of the substrate 44 transversely to the pivot 46.

The substrate 44 is mounted on the pivot 46. The pivot 46 for its part is driven by a motor 50, with the result that the substrate 44 and consequently the redirection region 42a are pivoted back and forth about the pivot 46. The pivot direction of the substrate 44 and thus of the redirection region 42a is indicated in FIG. 2 by way of a double-headed arrow 48.

The motor 50 is, for example, a moving-coil motor. The motor 50 is connected in a controllable manner to the control and evaluation device 28. However, rather than a moving-coil motor, it is also possible to use a drive device of a different type as the motor 50.

The transmitter redirection region 42a is located, as is also shown in FIG. 3, in the beam path of the light signals 20 of the transmission device 24. The light signals 20 are diffracted depending on their incidence on the redirection region 42a. The incidence is defined by an angle of incidence 52 and a point of incidence 53. The angle of incidence 52 is the angle between an incidence beam direction 54 of the light signals 20 and the entry surface of the transmitter redirection region 42a.

The diffractive structure of the transmitter redirection region 42a is embodied, for example, such that an angle of diffraction 56 on the exit side relative to the exit surface of the redirection region 42a is constant independently of the angle of incidence 52. A diversion angle 58 between the incidence beam direction 54 and the exit beam direction 57 of the redirected light signals 20 is composed of the angle of incidence 52 and the constant angle of diffraction 56. In order to change the diversion angle 58, the transmitter redirection region 42a is pivoted about the pivot 46, which merely leads to a change in the angle of incidence 52. The exit beam direction 57 of the light signals 20 in the monitoring region 16 is thus pivoted by pivoting the transmitter redirection region 42a. A field of view 64, which defines the monitoring region 16, can be scanned with the aid of the pivotable transmitter redirection region 42a. The field of view boundaries 49 of the field of view 64 are indicated in FIG. 3 by dashed lines.

The receiver light signal redirection device 40 comprises, as is shown in FIG. 2, a receiver redirection region 42b. The receiver redirection region 42b is a diffractive structure, for example a diffractive optical element.

In the exemplary embodiment shown, the receiver redirection region 42b is implemented on the same substrate 44 on which the transmitter redirection region 42a is also implemented. The receiver redirection region 42b is arranged on the side of the substrate 44 facing the receiver lens 38. The receiver redirection region 42b extends nearly over the entire width of the substrate 44 transversely to the pivot 46. The extent of the receiver redirection region 42b in the direction of the pivot 46 is greater than the corresponding extent of the transmitter redirection region 42a.

In the exemplary embodiment shown, the transmission light redirection device 34 and the receiver light signal redirection device 40 are mechanically coupled with the aid of the common substrate 44. In this way, the transmission redirection region 42a and the receiver redirection region 42b can be pivoted together with the pivot 46. Only a single motor 50 is necessary for this purpose.

In an alternative exemplary embodiment (not shown), the transmitter redirection region 42a and the receiver redirection region 42b can be implemented separately from one another, for example on separate substrates. The separate substrates can be connected to one another mechanically, for example on a common pivot, and be jointly driven. The transmitter redirection region 42a and the receiver redirection region 42b can also be mechanically separated from one another. In this case, the transmission device comprises at least one transmitter redirection region 42a and a dedicated drive device. The receiving device likewise comprises at least one receiver redirection region 42b and a dedicated drive device.

The receiver redirection region 42b is configured such that it is used to direct reflected light signals 22, coming from the monitoring region 16 in every pivot position of the receiver redirection region 42b, or of the substrate 44, onto the receiver lens 38. The redirected reflected light signals 22 are focused on the receiver 36 using the receiver lens 38.

The measurement apparatus 12 moreover has a position capturing device 60. The position capturing device 60 can be used to ascertain a pivot position of the substrate 44 and thus of the transmitter light redirection device 34 and the receiver light signal redirection devices 40.

The position capturing device 60 comprises a position region 62 in the form of a diffractive structure, for example a diffractive optical element, and an optical position detector 66.

The position region 62 is arranged on the side of the substrate 44 facing the transmission light source 30. The position region 62 is located, viewed in the direction of the pivot 46, by way of example between the transmitter redirection region 42a and the receiver redirection region 42b. The position region 62 extends, in the form of a strip, by way of example perpendicular to the pivot 46 nearly over the entire width of the substrate 44. The position region 62 is arranged sufficiently close to the transmitter redirection region 42 for part of the light signal 20, which has been expanded using the transmitter lens 32, as shown in FIG. 2, to be incident on the position region 62.

The diffractive structure of the position region 62 is configured such that light signals 20, which are incident on the position region 62, are encoded depending on the angle of incidence 52 of the light signals 20 on the position region 62. The encoding here characterizes the respective angle of incidence 52. In the exemplary embodiment shown, the light signals 20 are encoded and reflected as position light signals 68 and transmitted to the position detector 66.

The position detector 66 is arranged, by way of example, at the same height next to the transmitter light source 30. The position detector 66 can be designed for example as an individual detector, a line-scan detector or an area-scan detector. For this purpose, for example a CCD chip, a photodiode or the like can be used.

The encoded light signals 68 are converted to electric position signals using the position detector 66 and transmitted to the control and evaluation devices 28. The control and evaluation devices 28 are used to ascertain, from the electric position signals, the pivot deflection of the position region 62 and thus the pivot deflection of the substrate 44, of the transmitter redirection region 42a and of the receiver redirection region 42b. It is thus possible to ascertain a pivot position of the transmitter light redirection device 34 and the receiver light signal redirection device 40 with the aid of the capturing device 60.

In an exemplary embodiment (not shown), the position region 62 can be designed for transmission rather than for the reflection of the light signals. In this case, the position detector 66 is located on the side of the position region 62 opposite the transmitter light source 30.

During operation of the measurement apparatus 12, pulsed light signals 20 are transmitted by the transmission light source 30 through the transmission lens 32 onto the transmission redirection region 42a and the position region 62.

The light signals 20 are transmitted into the monitoring region 16 using the transmitter redirection region 42a depending on the pivot position of the substrate 44, that is to say depending on the angle of incidence 52. The light signals 22 reflected at the object 18 are directed onto the receiver lens 38 using the receiver redirection region 42. The reflected light signals 22 are focused onto the receiver 36 using the receiver lens 38. The reflected light signals 22 are converted to electric signals using the receiver 36 and transmitted to the control and evaluation device 28. Using the control and evaluation devices 28, the time of flight of the light signals 20 and of the corresponding reflected light signals 22 is ascertained and, based thereon, a distance of the captured object 18 from the measurement apparatus 12 is determined.

Furthermore, the portion of the light signals 20 that are incident on the position region 62 is encoded using the latter and transmitted as position light signals 68 to the position detector 66. The pivot position of the transmitter light signal redirection device 34 and the receiver light signal redirection devices 40 is determined from the position light signals 68. Based on the pivot position, the direction of the captured object 18 relative to the measurement apparatus 12 is ascertained.

During the measurement, the pivot 46 is rotated by the motor 50 and consequently the substrate 44 is pivoted back and forth. In this way, pulsed light signals 20 that have been emitted one after the other undergo different diversions into the monitoring region 16. In this way, the monitoring region 16 is scanned with the pulsed light signals 20.

FIGS. 4 and 5 show a transmission device 24 according to a second exemplary embodiment, wherein the transmitter light signal redirection device 34 is illustrated in two different pivot positions. The elements that are similar to those of the first exemplary embodiment from FIGS. 2 and 3 are provided with the same reference signs. In contrast to the first exemplary embodiment, the transmission device 24 of the second exemplary embodiment has two transmission light sources 30, specifically a transmitter light source 301, which is on the left in FIGS. 4 and 5, and a transmitter light source 30r on the right.

Moreover, the transmitter light redirection device 34 of the second exemplary embodiment has two transmitter redirection regions 42a, specifically a transmitter redirection region 42a-l, which is on the left in FIG. 4, and a transmitter redirection region 42a-r, which is on the right. The two transmitter redirection regions 42a-l and 42a-r are arranged next to each other corresponding to the two transmitter light sources 30. Each of the transmitter light sources 30 thus irradiates one of the transmitter redirection regions 42a-l or 42a-r.

The two transmitter redirection regions 42a-l and 42a-r have different diversion properties for light signals 20, or for the light signals 201 of the left transmitter light source 301 and the light signals 20r of the right transmitter light source 30r. Using the right transmitter redirection region 42a-r, incident light signals 20r are diverted to the right with respect to a perpendicular onto the surface of the transmitter redirection region 42a-r. Light signals 201 that are incident on the left transmitter redirection region 42a-l are diverted to the left with respect to the perpendicular onto the surface of the transmitter redirection region 42a-l. In this way, the field of view 64 of the measurement apparatus 12 and thus the monitoring region 16 are expanded as compared to only one transmitter redirection region 42a.

By pivoting the substrate 44 and thus the transmitter redirection regions 42a-l and 42a-r about the pivot 46, the beam direction of the light signals 201 and 20r of the two transmission light sources 301 and 30r is swept in each case over the monitoring region 40. FIG. 4 shows the transmitter light signal redirection device 34 at a maximum pivot position to the right. FIG. 5 shows the transmitter light signal redirection device 34 at a maximum pivot position to the left.

The transmission light sources 301 and 30r are operated at the same time, by way of example. In this way, two sections of the monitoring region 16 are simultaneously scanned at the same time. Alternatively, the transmission light sources 301 and 30r can be operated in alternation.

FIG. 6 shows a transmission light redirection device 34 according to a third exemplary embodiment. The elements that are similar to those of the first exemplary embodiment from FIGS. 2 and 3 are provided with the same reference signs. In contrast to the first exemplary embodiment, the substrate 44 in the third exemplary embodiment is not pivotable. Instead, the transmission light source 30 is linearly displaceable with the aid of a linear motor (not shown) in a displacement direction 70 parallel to the surface of the substrate 44 and consequently parallel to a transmitter redirection region 42a-var.

The transmitter redirection region 42a-var is a diffractive structure, for example a diffractive optical element, whose direction-changing properties vary with respect to the light signals 20 in the displacement direction 70 of the linear motor. For example, the angle of diffraction 56 between the beam direction of the diffracted light signals 20 and the surface of the transmitter redirection region 42*a*-*var*, for example, continuously increases from the right to the left in FIG. 6. Light signals 20 that are incident at a right point of incidence 53*r* on the transmitter redirection region 42*a*-*var* in the position of the transmitter light source 30 that is on the right in FIG. 6 are diverted to the right. In the position on the left in FIG. 6 of the transmitter light source 30, which is indicated in dashed lines, the light signals 20 that are incident on a left point of incidence 531 are diverted to the left.

Alternatively, it is also possible for a plurality of individual transmitter redirection regions 42*a* with different angles of diffraction 56 to be arranged next to one another rather than a single transmitter redirection region 42*a*-*var* with a varying angle of diffraction 56.

Figure 7:
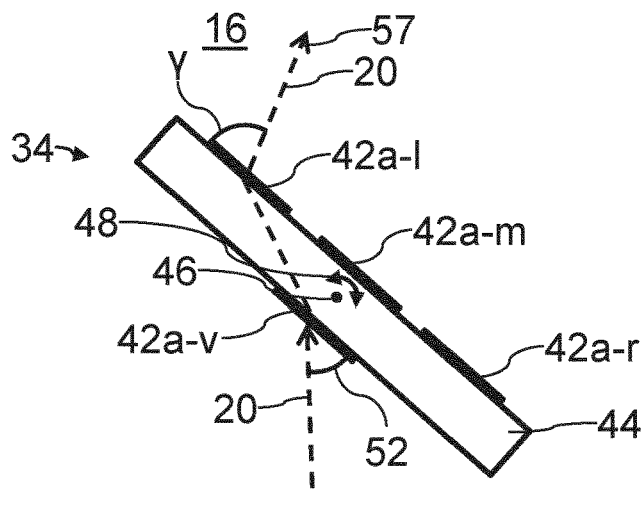
FIGS. 7 to 9 show a light signal redirection device of an optical measurement apparatus according to a fourth exemplary embodiment in three different pivot positions.
Figure 8:
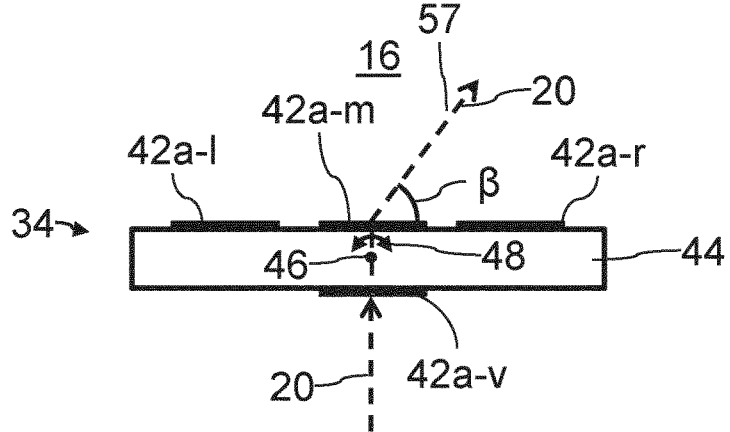
Figure 9:
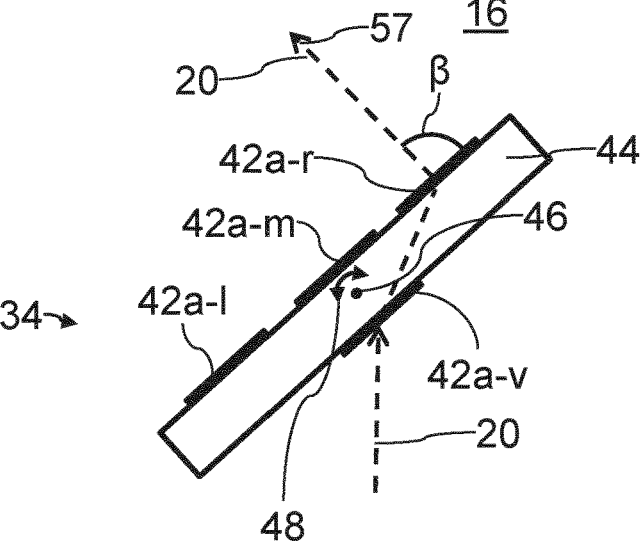

FIGS. 7 to 9 show a transmission light signal redirection device 34 according to a fourth exemplary embodiment in different pivot positions. The elements that are similar to those of the first exemplary embodiment from FIGS. 2 and 3 are provided with the same reference signs. The transmission light signal redirection device 34 in the fourth exemplary embodiment has by way of example, in contrast to the first exemplary embodiment, on the side facing away from the transmission lens 32 three transmitter redirection regions 42*a*, specifically a transmitter redirection region 42*a*-*l* that is on the left in FIGS. 7 to 9, a middle transmitter redirection region 42*a*-*m* and a transmitter redirection region 42*a*-*r* on the right.

The transmitter redirection regions 42*a* have different direction-changing properties with respect to the light signals 20. By way of example, the transmitter redirection region 42*ar*, which is on the right in FIGS. 7 to 9, only slightly diverts the light signals 20 at a fixed angle of diffraction α with respect to the surface of the transmitter redirection region 42*ar*, as shown in FIG. 9. The transmitter redirection region 42*a*-*m*, which is in the middle in FIGS. 7 to 9, diverts light signals 20 at a fixed angle of diffraction β with respect to the surface of the transmitter redirection region 42*a*-*m* to the right, as shown in FIG. 8. The transmitter redirection region 42*a*-*l*, which is on the left in FIGS. 7 to 9, diverts light signals 20 at a fixed angle of diffraction γ with respect to the surface of the transmitter redirection region 43*a* to the left, as shown in FIG. 7.

Furthermore, a further transmitter redirection region 42*a*, specifically a transmitter redirection region 42*a*-*v* that is, viewed in the beam direction of the light signals 20, a front transmitter redirection region is arranged on the side of the substrate 44 facing the transmitter light source 30. The front transmitter redirection region 42*c* is a diffractive structure, in particular a diffractive optical element. The front transmitter redirection region 42*a*-*v* is located upstream of the pivot 46 at the centre of the substrate 44. In this way, the front transmitter redirection region 42*a*-*v* is struck by light signals 20 that are directed at the pivot 46.

The front transmitter redirection region 42*a*-*v* is designed such that it directs the light signals 20 onto one of the three rear transmitter redirection regions 42*a*-*l*, 42*a*-*m* or 42*a*-*r* in dependence on the angle of incidence 52 of the light signals 20 that are incident in the incidence beam direction 54, that is to say in dependence on the pivot position of the transmitter light signal redirection device 34.

FIG. 7 shows the transmission light redirection device 34 at its maximum right pivot position. In this pivot position, the incident light signals 20 are directed to the left onto the left transmitter redirection region 42*a*-*l* using the front transmitter redirection region 42*a*-*v*. The light signals 20 are redirected to the left using the left transmitter redirection region 42*a*-*l* with the angle of diffraction γ. Overall, the exit beam direction 57 of the light signals 20 is thus swept within the region of the centre of the monitoring region 16.

By pivoting the substrate 44 to the left, the exit beam direction 57 is swept further to the left until the incident light signals 20, which have been diffracted using the front transmitter redirection region 42*a*-*v*, leave the left transmitter redirection region 42*a*-*l* and are incident instead on the middle transmitter redirection region 42*a*-*m*.

Using the middle transmitter redirection region 42*a*-*m*, the light signals 20 are directed in the middle pivot position shown in FIG. 8 onto the right side of the monitoring region 16.

By pivoting the substrate 44 to the left, the exit beam direction 57 is swept further to the left until the incident light signals 20, which have been diffracted using the front transmitter redirection region 42*a*-*v*, leave the middle transmitter redirection region 42*a*-*m* and are incident instead on the right transmitter redirection region 42*a*-*r*.

Using the right transmitter redirection region 42*a*-*r*, the light signals 20 are directed into the left region of the monitoring region 16. As the transmitter light signal redirection device 34 continues to be pivoted to the left, the light signals 20 scan the left region of the monitoring region 16 until the transmitter light signal redirection device 34 reaches its left pivot position shown in FIG. 9. In the left pivot position, the light signals 20 are directed onto the left side of the monitoring region 16.

Subsequently, the pivot direction of the transmitter light signal redirection device 34 is reversed, which means that, one after the other, the middle transmitter redirection region 42*a*-*m* and the left transmitter redirection region 42*a*-*l* are used to scan first the right region of the monitoring region 16 and then the middle region of the monitoring region 16 with the light signals 20.

With the aid of the different angles of diffraction α, β, γ of the three transmitter redirection regions 42*a*, specifically 42*a*-*l*, 42*a*-*m* and 42*a*-*r*, in combination with the pivot angle of the transmitter light signal redirection device 34 about the pivot, a correspondingly larger field of view 64 is swept than is possible with only one transmitter redirection region 42*a* from the first exemplary embodiment.

In further exemplary embodiments (not shown), the features of the different transmitter light signal redirection device 34, as are shown in FIGS. 2 to 9, can expediently also be used for different receiver light signal redirection devices 40. In particular, receiver redirection regions can be implemented similarly to the described transmitter redirection regions.

The invention claimed is:

1. A receiving device for an optical measurement apparatus for capturing objects in a monitoring region, the receiving device comprising:

at least one light signal redirection device for redirecting light signals from the monitoring region to at least one receiver of the receiving device, wherein the at least one light signal redirection device has at least one redirection region that can act on the light signals so as to change their direction, wherein the at least one redirection region is implemented in, at or on at least one substrate that is transmissive to the light signals;

the at least one receiver for receiving and for converting the light signals into electric signals; and at least one drive device with which the at least one redirection region is set, wherein the at least one redirection region has at least one diffractive structure.

2. The receiving device according to claim 1, wherein the at least one diffractive structure is configured as a diffractive optical element.

3. The receiving device according to claim 1, wherein the at least one redirection region acts to be transmissive to the light signals or to be reflective for the light signals.

4. The receiving device according to claim 1, wherein the at least one redirection region is arranged on a light entry side of a substrate or a light exit side of the substrate.

5. The receiving device according to claim 1, wherein the at least one light signal redirection device has at least two redirection regions, which are arranged one behind the other with respect to a beam path of the light signals.

6. The receiving device according to claim 1, wherein a direction-changing property of the at least one redirection region varies over its extent in at least one direction of extent or the at least one light signal redirection device has at least two redirection regions with different direction-changing properties.

7. The receiving device according to claim 1, wherein the at least one redirection region is movable using the at least one drive device.

8. The receiving device according to claim 1, wherein the at least one redirection region is arranged so as to be at least one of rotatable, pivotable, or displaceable.

9. The receiving device according to claim 1, wherein the at least one receiver has at least one avalanche photodiode, a diode array, or a CCD array.

10. The receiving device according to claim 1, wherein the receiving device has at least one optical system, which is arranged between the at least one receiver and the at least one redirection region.

11. A light signal redirection device for a receiving device of an optical measurement apparatus for capturing objects in a monitoring region, the light signal redirection device comprising: at least one redirection region that acts on light signals from the monitoring region so as to change their direction, wherein the at least one redirection region has at least one diffractive structure and is implemented in, at or on at least one substrate that is transmissive to the light signals.

12. An optical measurement apparatus for capturing objects in a monitoring region, comprising:

at least one transmission device for transmitting light signals into the monitoring region;

at least one receiving device with which the light signals that have been reflected at the objects that may be present in the monitoring region is received; and at least one control and evaluation device with which the at least one transmission device and the at least one receiving device is controlled and with which the light signals received can be evaluated, wherein the at least one receiving device comprises:

at least one light signal redirection device for redirecting the light signals from the monitoring region to at least one receiver of the at least one receiving device, wherein the at least one light signal redirection device has at least one redirection region that acts on the light signals so as to change their direction, wherein the at least one redirection region is implemented in, at or on at least one substrate that is transmissive to the light signals, the at least one receiver for receiving and for converting the light signals into electric signals, and at least one drive device with which the at least one redirection region is set, wherein the at least one redirection region of the at least one receiving device has at least one diffractive structure.

13. A method for operating a receiving device of an optical measurement apparatus for capturing objects in a monitoring region, the method comprising:

transmitting light signals from the monitoring region onto at least one redirection region of at least one light signal redirection device, wherein the at least one redirection region is implemented in, at or on at least one substrate that is transmissive to the light signals;

changing a direction of the light signals with the at least one redirection region in dependence on an incidence of the light signals; and directing the light signals to at least one receiver of the receiving device, wherein the at least one redirection region is set using at least one drive device, and wherein the direction of the light signals is set with the aid of at least one diffractive structure.

14. The method according to claim 13, wherein the at least one redirection region is moved to set the at least one redirection region.

* * * * *